C. F. BYRNE.
AUTOMATIC WATER CONTROL FOR ENSILAGE CUTTERS.
APPLICATION FILED JUNE 6, 1921.

1,434,349. Patented Oct. 31, 1922.

Inventor:
Charles F. Byrne
By his Attorneys:
Blackmore, Spencer & Hurd

Patented Oct. 31, 1922.

1,434,349

UNITED STATES PATENT OFFICE.

CHARLES F. BYRNE, OF JANESVILLE, WISCONSIN, ASSIGNOR TO GENERAL MOTORS CORPORATION, OF DETROIT, MICHIGAN, A CORPORATION OF DELAWARE.

AUTOMATIC WATER CONTROL FOR ENSILAGE CUTTERS.

Application filed June 6, 1921. Serial No. 475,358.

*To all whom it may concern:*

Be it known that I, CHARLES F. BYRNE, a subject of the King of Great Britain, and a resident of Janesville, county of Rock, and State of Wisconsin, have invented certain new and useful Improvements in Automatic Water Controls for Ensilage Cutters, of which the following is a full, clear, concise, and exact description, such as will enable others skilled in the art to which the invention relates to make and use the same, reference being made therein to the accompanying drawings, which form a part of this specification.

My invention relates to ensilage cutting machines, and particularly to means associated with such machines for supplying water to the ensilage as the same is cut and conveyed to the silo wherein it is stored.

It is desirable to supply a certain quantity of water to the ensilage as it is packed in the silo, as the same is thereby found to be in better condition when removed and fed than would otherwise be the case; and various schemes have heretofore been employed for supplying such water to the ensilage prior to the cutting thereof or during the passage thereof from the cutter to the silo, or after it has been deposited within the silo. There has, however, so far as I am aware been no effort to control the water thus supplied automatically, and proportion the same to the quantity of ensilage being cut and supplied to the silo at any given instant; the supply of water having heretofore been indefinitely co-related to the quantity of material being operated upon and the supply thereof not having been automatically controlled, or regulated at all except as by the usual valve naturally present in the water supply conduit.

The principal object of my invention is to provide an improved device or scheme for use with ensilage cutters wherein the quantity of water supplied to the ensilage is always in direct proportion to the quantity of ensilage passing to the silo, in order that like quantities of ensilage may be supplied with like quantities of water when the machine is in operation.

A further object of my invention is to provide water supply means in and associated with an ensilage cutter and wherein the supply of water to the ensilage being cut and supplied to the silo is controlled by variations in the position assumed by a feed roll of the machine, the position of which feed roll in turn is dependent upon the quantity of ensilage passing to the cutting mechanism of the cutter.

With the above and other objects of invention in view, my invention consists in the improved water supply means associated with ensilage cutters illustrated in the accompanying drawing and hereinafter described and claimed; and in such variations and modifications thereof, within the scope of the concluding claims, as will be obvious to those skilled in the art to which my invention relates.

Referring now to the drawing wherein the preferred embodiment of my invention is illustrated:

Figure 1:
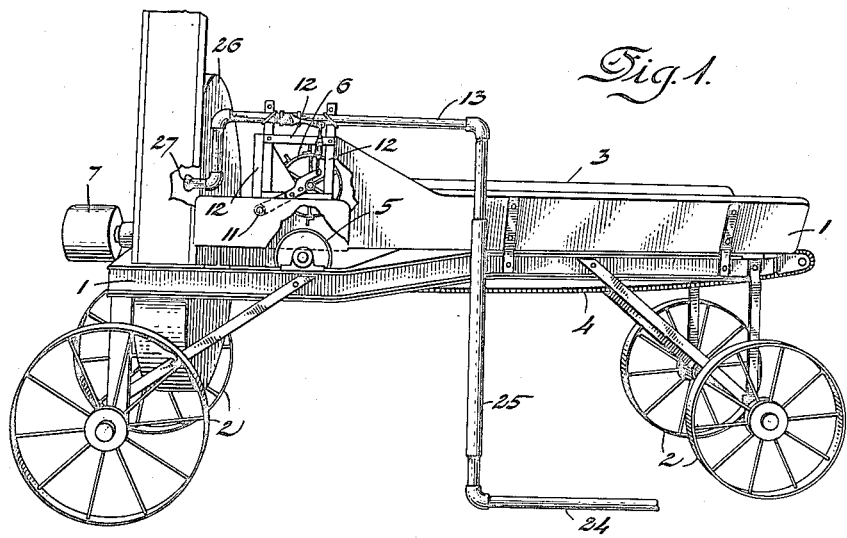
Figure 1 is a general schematic view showing an ensilage cutter of conventional form in side elevation, the same being equipped with water supply means in accordance with my invention.
Figure 2:
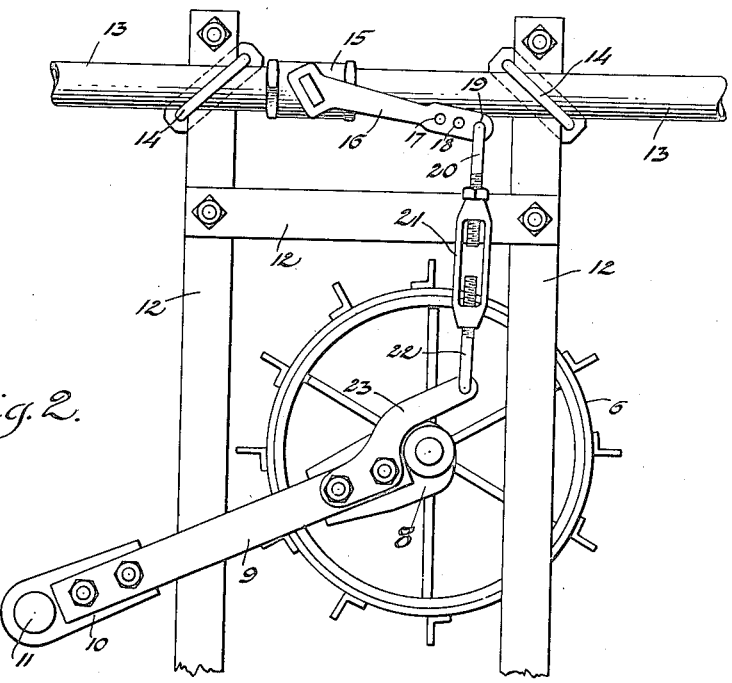
Figure 2 is a fragmentary view upon a larger scale illustrating the relationship between one of the feed rolls of the machine and the water supply mechanism.

Referring to the drawing, the reference numeral 1 designates the main frame of an ensilage cutter, the same being of any form appropriate for supporting the various elements of the machine, as will be appreciated, and which frame is ordinarily supported by suitable wheels 2 so that the machine may be readily moved about. The reference numeral 3 designates a suitable trough along which the material being cut moves toward the feed rolls 5, 6, and between and past said feed rolls to the cutting mechanism of the machine; the machine illustrated being one in which the cutting mechanism is in the form of a disc having cutting knives and fan vanes thereupon, said disc being arranged transverse to the path of movement of the ensilage. This disc is located within a fan casing 26 from which the ensilage is blown through a suitable discharge conduit and into a silo, and the same is of comparatively large diameter and acts as a flywheel when the cutter is in use.

It may be here remarked, however, that my invention is in no way limited to an ensilage cutter having the particular form of fan and cutting blade arrangement shown conventionally in Figure 1 of the drawing but, on the contrary, may be used in connection with ensilage cutters having other forms and arrangements of cutting mechanism and blower; and in fact with ensilage cutters in which the cutting mechanism and the fan for delivering the cut material to the silo are independent of one another, structurally considered.

The material operated upon is advanced toward the feed rolls 5, 6 by a travelling conveyor 4 movable along the trough 3, and the feed rollers are operated from the main shaft of the combined fan and cutter disc through any suitable mechanism not shown in detail, but which is located in the machine shown upon the far side thereof; the cutter and fan being driven through a drive pulley 7 and the feed roll being ordinarily driven through worm gearing. These, however, are features not directly concerned with my invention, and are therefore not illustrated in detail.

The lower feed roll 5 is illustrated as supported by a shaft the bearings of which are fixed relative to the frame of the machine while the upper feed roll 6 is carried by a shaft the ends of which are supported in bearings in brackets or castings 8, which brackets are secured to the ends of two oscillating bars or links 9 located one at each end of the roll but the near one only of which is shown. The ends of these links are secured to other castings 10 which in turn are supported upon a fixed shaft 11 so that the roll 6 may swing about the shaft 11 as a center or axis, this construction or its equivalent being present at each end of the upper feed roll 6 in order that the same may move toward and from the lower feed roll 5 as the volume or mass of ensilage pasing between the feed rolls varies; the upper feed roll being held down and in feeding engagement with the material passing between the rolls by suitable spring mechanism not shown. As regards this matter, however, it will be appreciated that ensilage cutters have heretofore been equipped with feed rolls the upper one of which is movable vertically to accommodate varying masses of material; and that, while my invention contemplates the presence of a vertically movable feed roll, the same is not directly concerned with the manner in which such vertical movement is provided for nor with the mechanism whereby such movement is secured.

The reference numeral 12 designates a frame or support, and 13 designates a water supply pipe secured to said frame in any way as by means of clasps 14. This water supply conduit is connected with a suitable source of water indicated conventionally by the reference numeral 24; a flexible hose section 25 being ordinarily interposed between the source of water supply and the piping upon the machine.

The water supply pipe is provided with a valve 15 having an arm 16 provided preferably with a plurality of holes 17, 18, 19; and the numerals 20, 21 and 22 designate parts of an adjustable connecting rod or turn buckle through which the free end of the arm 16 is connected with an arm 23 which is carried by the upper feed roll supporting mechanism made up of the arm 9 and brackets 8 hereinbefore referred to. It therefore follows that the flow of water through the conduit 13, which is controlled by the valve 15, will be regulated and varied by the upward and downward movement of the feed roll 6; the arrangement of the parts being obviously such that the flow of water is increased as the feed roll moves upward, and vice versa, in order to increase the supply of water to the ensilage as the quantity cut increases, and decrease the supply as the quantity cut decreases.

The water supply conduit discharges into the fan casing 26 through a nozzle at 27, so that the water mixes with the cut ensilage as it passes to the silo; and the arrangement of the parts is such that when the feed roll 6 is in the lowermost position which it assumes when no material is pasing between the rolls the supply of water will be entirely cut off, this end being attained by properly adjusting the length of the turn buckle as will be appreciated.

In view of the premises it will be appreciated that the supply of water is in all cases directly proportional to the quantity of ensilage being cut and supplied to the silo, such quantity increasing as the upper feed roll rises due to increased mass of material present between the rolls and decreasing as such feed roll moves downward. The supply of water will be entirely cut off when the feed roll 6 moves into its lowermost position in which no ensilage is being cut; and the flow of water is at all times automatically controlled, and requires no attention on the part of the operator of the machine. The quantity or percentage of water supplied to the ensilage being cut may obviously be varied and determined by connecting the upper end of the turn buckle with one or another of the holes 17, 18, 19 in order to secure a wetter or a dryer product; the automatic regulation of the supply of water being obviously controlled by the rising and falling of the upper feed roll whichever of the holes the upper end of the turn buckle is hooked into.

Having thus described and explained my invention, I claim and desire to secure by Letters Patent:

1. In combination in an ensilage cutter having rotating feed rolls between which the material being cut passes, and one of which is movable away from the other; a water supply conduit through which water is supplied to the material operated upon; a valve for controlling the flow through said conduit; and connecting means through which said valve is operated from said movable feed roll.

2. In combination in an ensilage cutter having rotating feed rolls between which the material operated upon passes, and one of which is movable vertically away from the other; a water supply conduit through which water is supplied to the cut ensilage; a valve for controlling the flow through said conduit; and means whereby and through which said valve is controlled by the vertical movement aforesaid of said movable feed roll.

3. In combination in an ensilage cutter having rotating feed rolls between which the material being cut passes, a water supply conduit through which water is supplied to the material being cut; a valve for controlling the flow through said conduit; and means operated by one of said feed rolls for controlling said valve.

4. In combination in an ensilage cutter having rotating feed rolls between which the material operated upon passes, and a fan casing through which the cut ensilage passes; a water supply conduit discharging into said fan casing; and a valve controlled by one of said feed rolls and adapted to control the flow through said water supply conduit.

5. In combination in an ensilage cutter having rotating feed rolls between which the material operated upon passes and one of which is movable vertically relative to the other, and a fan casing through which the cut material passes; a water supply conduit carried by the machine and discharging into said fan casing; a valve for controlling the flow through said conduit; and operating means between said valve and said movable feed roll and through which said valve is operated from said feed roll.

6. In combination in an ensilage cutter having rotating feed rolls between which the material operated upon passes and one of which is movable vertically relative to the other, and a fan casing through which the cut material passes; a water supply conduit carried by the machine and discharging into said fan casing; a valve for controlling the flow through said conduit; an arm carried by said valve; and an adjustable connection between said movable feed roll and the arm of said valve.

In testimony whereof I affix my signature.

CHARLES F. BYRNE.